O. S. JONES.
VEHICLE DIRECTION INDICATOR.
APPLICATION FILED FEB. 14, 1922.
1,437,248.
Patented Nov. 28, 1922.
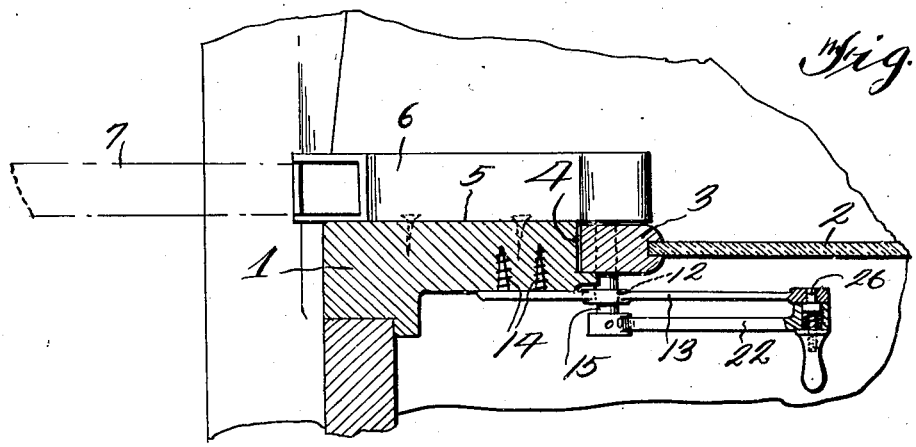
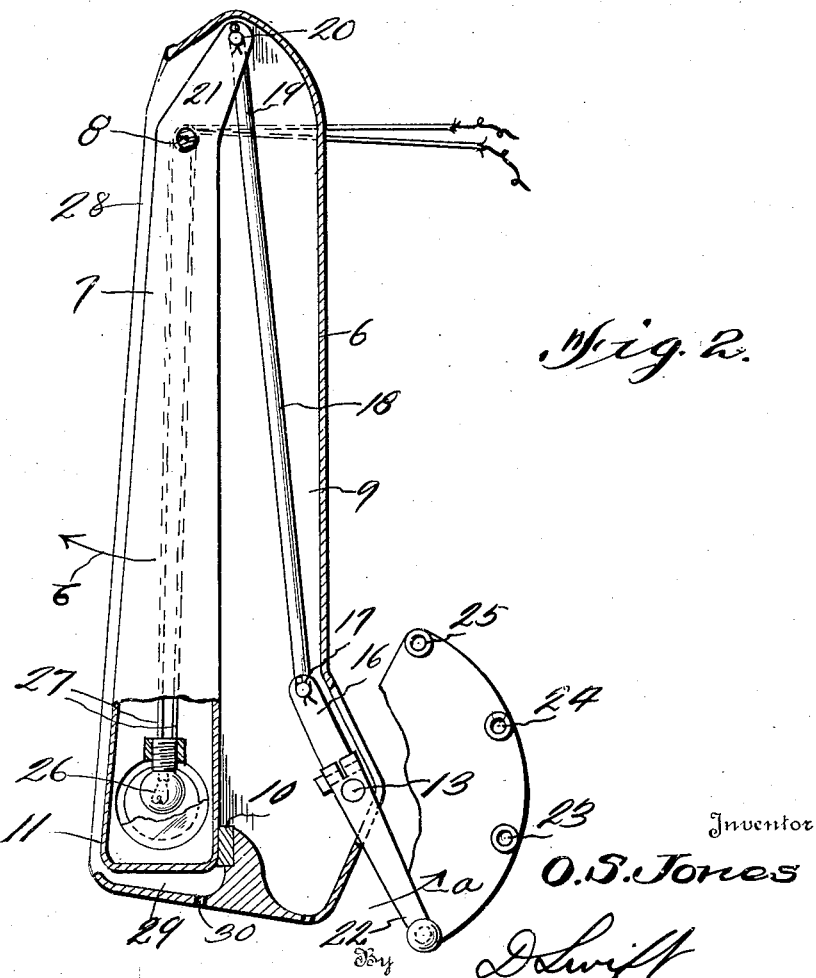
Inventor
O. S. Jones Patented Nov. 28, 1922.

1,437,243

UNITED STATES PATENT OFFICE.

OWEN SIDNEY JONES, OF TRENTON, MISSOURI.

VEHICLE DIRECTION INDICATOR.

Application filed February 14, 1922. Serial No. 536,595.

*To all whom it may concern:*

Be it known that I, OWEN S. JONES, a citizen of the United States, residing at Trenton, in the county of Grundy, State of Missouri, have invented a new and useful Vehicle Direction Indicator; and I do hereby declare the following to be a full, clear, and exact description of the invention, such as will enable others skilled in the art to which it appertains to make and use the same.

The invention relates to vehicle direction indicators, and has for its object to provide a device of this character comprising a vertically disposed casing carried adjacent the windshield of an automobile, said casing having pivotally mounted therein a signaling arm adapted to be moved outwardly for signaling approaching vehicles. Also to provide a pivoted lever having a connecting rod connection to the pivoted signaling arm and provided with detent means whereby the signaling arm may be held in various positions angularly in relation to the casing for signaling approaching vehicles as to the intention of the operator to turn to the right or left, or to stop.

A further object is to construct the signaling device in such a manner that the signal arm will return to position in the casing by gravity, when the operating lever detent means is released. Also to provide illuminating means for the free end of the signaling arm thereby allowing the device to be used at night.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a horizontal sectional view through one side of a windshield and the adjacent corner post of an automobile body, showing the direction indicator applied thereto.

Figure 2 is a vertical sectional view through the signal arm casing, showing the arm housed therein and also showing the operating mechanism for the arm.

Referring to the drawings, the numeral 1 designates one of the corner posts, preferably the left corner post of an automobile body and 2 a windshield disposed adjacent thereto, which windshield preferably has its side rail 3 disposed in the channel 4 of the post 1, and held therein in the usual manner. Secured to the outer face 5 of the post 1 is the vertically disposed signal arm casing 6, in which casing the signal arm 7 is pivotally mounted on a shaft 8 located adjacent the upper end of the casing. The signal arm 7 is preferably hollow and is normally disposed when not in use in the position shown in Figure 2, to which position the arm returns by gravity when the operating mechanism and detent mechanism hereinafter set forth is released. Disposed within the chamber 9 of the casing 6 is a bumper 10, which bumper may be formed from leather or any other resilient material and is positioned where it will be engaged by the free end 11 of the signal arm 7, after said arm has passed into the chamber 9 of the casing 6. Pivotally mounted in a bearing 12 of a plate 13 which is secured to a post 1 by means of screws 14 is an operating shaft 15. The inner end of the operating shaft 15 extends through the side rail 3 of the windshield and into the chamber 9 of the casing 6. The end of the shaft 15 which is disposed in the chamber 9 of the casing 6 is provided with an arm 16, which has pivoted thereto at 17 a connecting rod 18, said connecting rod having its upper end 19 pivotally connected at 20 to an upwardly and inwardly extending arm 21 carried by the signal arm 7, and extending above the shaft 8 on which the signal arm is pivotally mounted. It will be seen that when the operating lever 22, which is secured to the end of the shaft 15 is moved upwardly in the direction of the arrow *a* that the signal arm 7 will move outwardly from the chamber 9 of the casing 6 in the direction of the arrow *b*, said movement of the signal arm being caused by a downward pull on the connecting rod 18. The plate 13 is provided with spaced apertures 23, 24, and 25, with which apertures the spring actuated detent carried by the operating lever 22 cooperated in such a manner as to hold the lever 7 in various positions. When the detent 26 is in the aperture 23, the signaling arm 7 inclines downwardly and outwardly and indicates to an approaching vehicle that the operator intends to turn to the left. If the detent is disposed in the aperture 24 the arm 7 is substantially horizontally disposed, thereby indicating to an approaching vehicle that the operator intends to stop the vehicle. When the detent is in the aperture 25, the arm 7 inclines outwardly and upwardly thereby indicating to an approaching vehicle that the operator contemplates turning to the right.

The signal arm 7 adjacent its outer end is provided with an electric bulb 26, to which bulb electric conductor wires 27 lead, said wires passing through the arm and leaving the arm adjacent its pivotal point. By providing a light in the arm, it will be seen that the signaling device may be used at night as well as in the day.

From the above it will be seen that a manually operated vehicle signal is provided, which is simple in construction, the parts reduced to a minimum, and the parts so arranged that the operation is positive and the danger of the signal becoming inoperative incident to breakage and multiplicity of parts is eliminated. It will be seen that the arm 7 is of substantially of the same width as the width of the chamber 9 of the casing 6 therefore the arm forms substantially a closure for the opening 28 in the casing. Also that any water which may gather in the end 29 of the chamber 9 will drain from the same from the drain opening 30.

The invention having been set forth what is claimed as new and useful is:—

A vehicle signal comprising a vertically disposed elongated casing having a chamber therein, a signal arm pivotally mounted in the upper end of the chamber of said casing and having its free end downwardly disposed and entirely housed in the casing, said signal arm being substantially vertically disposed, a bumper disposed within the lower end of the chamber of the casing and in alignment with the free end of the signal arm, an upwardly extending arm carried by the signal arm above its pivotal point, an operating lever in the same plane as the signalling arm, a shaft carried by said operating lever and horizontally disposed and having one of its ends disposed in the chamber of the casing, said casing being provided with an offset portion, an upwardly extending arm carried by said shaft and disposed within the offset portion of the casing chamber, a connecting rod connecting the upwardly extending arm carried by the shaft and the upwardly extending arm carried by the signal arm, said shaft being disposed in the offset portion of the casing and means for holding the operating lever in various positions.

In testimony whereof I have signed my name to this specification in the presence of two subscribing witnesses.

OWEN SIDNEY JONES.

Witnesses:
 BESSIE BRUMMITT,
 W. C. COLLIER.